United States Patent
Hardy et al.

(10) Patent No.: US 7,568,183 B1
(45) Date of Patent: Jul. 28, 2009

(54) SYSTEM AND METHOD FOR AUTOMATION TESTING AND VALIDATION

(75) Inventors: Donald G. Hardy, Seattle, WA (US); Aaron R. Birnbaum, Brier, WA (US); Alan T. B. Brown, Ellensburg, WA (US); Curtis D. Anderson, Kent, WA (US); Patrick J. Niemeyer, Seattle, WA (US); James Rodrigues, Redmond, WA (US); Loren James Merriman, Duvall, WA (US); Micah A. Koffron, Redmond, WA (US); Ross F. Smith, Jr., Eastsound, WA (US); Peter Gerber, Sammamish, WA (US); Jared W. Wilson, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1177 days.

(21) Appl. No.: 11/041,477

(22) Filed: Jan. 21, 2005

(51) Int. Cl.
*G06F 9/44* (2006.01)
(52) U.S. Cl. .................................. 717/121; 717/124
(58) Field of Classification Search ......... 717/100–102, 717/124–125, 120–122; 709/217, 219; 714/4; 702/186
See application file for complete search history.

(56) References Cited

U.S. PATENT DOCUMENTS

| | | | |
|---|---|---|---|
| 6,505,342 B1 | 1/2003 | Hartmann et al. | 717/104 |
| 6,694,509 B1 | 2/2004 | Stoval et al. | 717/124 |
| 6,895,578 B1 | 5/2005 | Kolawa et al. | 717/130 |
| 6,986,125 B2 | 1/2006 | Apuzzo et al. | 717/124 |
| 7,028,290 B2 * | 4/2006 | Srivastava et al. | 717/124 |
| 7,287,242 B2 | 10/2007 | Chang | 717/124 |
| 2004/0088602 A1 | 5/2004 | Cohen et al. | 714/38 |
| 2005/0071818 A1 | 3/2005 | Reissman et al. | 717/127 |
| 2005/0166094 A1 | 7/2005 | Blackwell et al. | 714/38 |
| 2006/0277439 A1 | 12/2006 | Davia et al. | 714/38 |

OTHER PUBLICATIONS

Srivastava et al, "Effectively Prioritizing Tests in Development Environment", ACM 2002 pp. 97-106 (provided as Srivastava_Echelon. pdf).*
U.S. Appl. No. 11/041,340, entitled *System and Method for Allocating Automation Testing Resources Based on Projections*, filed Jan. 21, 2005, Niemeyer et al.
U.S. Appl. No. 11/041,341, entitled *System and Method for Selecting Applicable Tests in an Automation Testing System*, filed Jan. 21, 2005, Hardy et al.

* cited by examiner

*Primary Examiner*—Tuan Anh Vu
(74) *Attorney, Agent, or Firm*—Merchant & Gould, P.C.

(57) ABSTRACT

Software automation testing and validation are provided according to a system that runs automation tests using multiple lab machines and allows the testing to be performed before checking in the code to a version control system. Code changes in a build of the software are provided on a computing device. Automation tests are selected from a list of available tests. When indicated by a job queue, the changed code of the build is forwarded to lab machines allocated by an automation system. An image of the build from the computing device is generated on the lab machines and the automation tests are run against the build. A report is generated and forwarded back to one or more recipients that notifies of the success or failure of the automation testing.

20 Claims, 5 Drawing Sheets

SYSTEM AND METHOD FOR AUTOMATION TESTING AND VALIDATION

CROSS-REFERENCE TO RELATED APPLICATIONS

The present invention is related to patent applications entitled: "System and Method for Allocating Automation Testing Resources Based on Projections" having Ser. No. 11/041,340, filed Jan. 21, 2005 and "System and Method for Selecting Applicable Tests in an Automation Testing System" having Ser. No. 11/041,341, filed Jan. 21, 2005. The related applications are assigned to the assignee of the present patent application and are hereby incorporated by reference.

BACKGROUND OF THE INVENTION

Test automation systems are used to automatically test software. Software testing using an automatic test program generally avoids the errors that humans make when they tire after multiple repetitions. For example, the automation test program provides consistent test execution and does not skip or add any tests by mistake. The test program can perform the functions much quicker then a normal human being using the product, and record the results of the test accurately. The results are automatically fed into a database that may provide useful statistics on how well the software development process is going.

Currently, for most software projects, thorough automation is not even executed before developers check in their code. Automation has been traditionally limited to testing code after it has been checked in due to time constraints related to testing code changes before they are checked in.

Automation testing also becomes problematic for large-scale software development projects. As the project size increases, the time required to run the automation lengthens. At a certain point, the time required to run the automation is so long that running the automation for the code changes has become prohibitively time consuming. Large-scale software development projects may have numerous developers making code changes that affect code in other parts of the project. Without comprehensive testing of each of the code changes, the software project may take on bugs and errors in one area that impacts one or more related areas. The late cycle discovery of the dependencies introduces project delays because of the time required to back out the problematic code. What is needed is a system that provides automation testing over a relatively shorter period of time as changes to code are made and submitted by developers before the code is checked in.

SUMMARY OF THE INVENTION

Aspects of the present invention are related to a system and method that consistently provides automation testing and verification over a relatively short period of time. The present invention allows developers to run the equivalent of many hours of automated testing against a specific code change in short period of time (e.g., 1-2 hours). Large software development projects may have many developers concurrently working on the project simultaneously. Changes made by a particular developer could affect the code being worked on by another developer in the project. The present invention testing and validation process allows the code changes to be verified before they are inserted into the version control system that stores the current build version of the software project.

In accordance with one aspect of the present invention, a computer-implemented method is provided for automation testing of a software product. A set of automation tests is selected to run against a lab build of the software product. A lab build refers to the lab's version of the individual build of the software product created by the developer. The difference between an individual build of the software product and a checkpoint build of the software product is then determined. The individual build is the build generated by the developer (i.e., the developer's computing device) that includes the developer's code changes. The checkpoint build corresponds to a build of the software product included in a version control system that corresponds to the latest working build of the software product (e.g., includes all changes from all developers as of a particular date and time). With the difference between the individual build and the checkpoint build determined, a set of data files is generated that corresponds to the difference between the individual build and the checkpoint build. The set of data files is forwarded to an allocated group of lab machines, wherein the group of lab machines is allocated to run the selected automation tests against the lab build. Test results are received back upon the completion of running the selected automation tests against the lab build.

In accordance with another aspect of the present invention, a test automation and validation system is provided that includes a computing device, an automation manager, and an array of machines in a lab. The computing device is arranged to initiate a process that identifies code change information corresponding changed code in an individual build of a software product. The automation manager is arranged to receive the code change information, identify a set of automation tests, and manage a job queue that includes a job request for running the automated tests on the changed code. The lab machines are allocated according to the job request such that an allocated group of the lab machines runs the set of automation tests against an installation of the individual build of the software product.

DETAILED DESCRIPTION OF THE PREFERRED EMBODIMENT

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
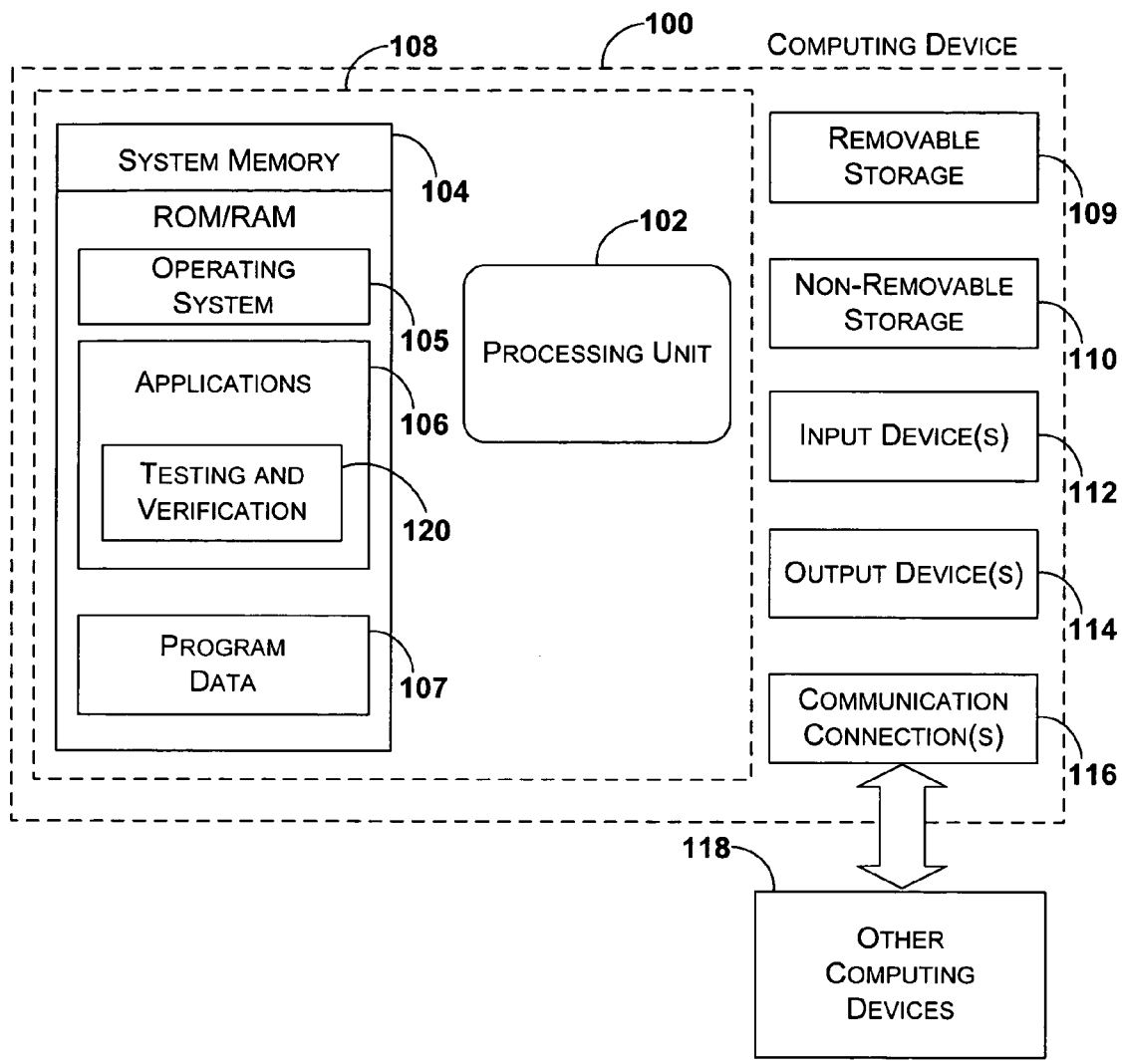
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. In one embodiment, applications 106 further include a testing and verification application 120 that, in combination with the other portions of computing device 100, provides the functionality for initiating an automation test session in accordance with the present invention. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System and Method for Automation Testing and Verification

Aspects of the present invention are related to an automation testing and verification process that allows a developer to perform hours of automation testing in a relatively short period of time. Large software development projects may have hundreds, possibly thousands, of developers concurrently working on the project simultaneously. The developers may work individually, submitting their contributions to the project as they are completed. It is possible that any one of the changes made by a particular developer could affect the code being worked on by another developer in the project. These conflicts may cause substantial delays in completing the project since the developers may be forced to wait until these conflicts are resolved before continuing with their work. Without doing the testing provided by the present invention before check in of the code, the cost of find any bugs/failures is greatly increased. The bugs are instead found in the central or main build (i.e., the checkpoint build) that includes not only the developers change, but all developer changes. When the errors are caught at this point, the changes that caused the bug are much harder to track down. Furthermore, the changes are fresh in the developer's mind at the time the present invention is used, rather than the days or weeks later associated with testing the main build (i.e., the checkpoint build that corresponds to changes from all developers).

The present invention solves for much of these delays by providing an automation testing and verification process that allows a developer to test their changes in the code before submitting the code to the version control system. The testing and validation process allows the code changes to be verified before they are inserted into the version control system that stores the current build version of the software project.

The present invention takes the individual build that the developer has produced on their local computing device and runs a selected set of available automation against that build using allocated resources. A method for pre-selecting the set of automation tests or Build Verification Tests (BVTs) according to the code changed and other factors is described in the patent application entitled, "System and Method for Selecting Applicable Tests in an Automation Testing System", that is referenced in the cross-reference to related applications section. Similarly, a method for allocating the resources based on projected need and other factors is described in the patent application entitled, "System and Method for Allocating Automation Testing Resources Based on Projections" that is also referenced in the cross-reference to related applications section. Both of these patent applications are hereby incorporated by reference in their entirety.

Once the automation tests selected, and the resources have been allocated, the individual build is assigned to an appropriate number of lab machines (i.e., computing devices) for running the automation tests. The lab machines distribute the number of machine hours for running the automation across the lab machines. Distributing the work allows a set of automation tests that would have otherwise taken many machine hours to complete, to be completed in 1-2 hours or other designated range of time.

Figure 2:
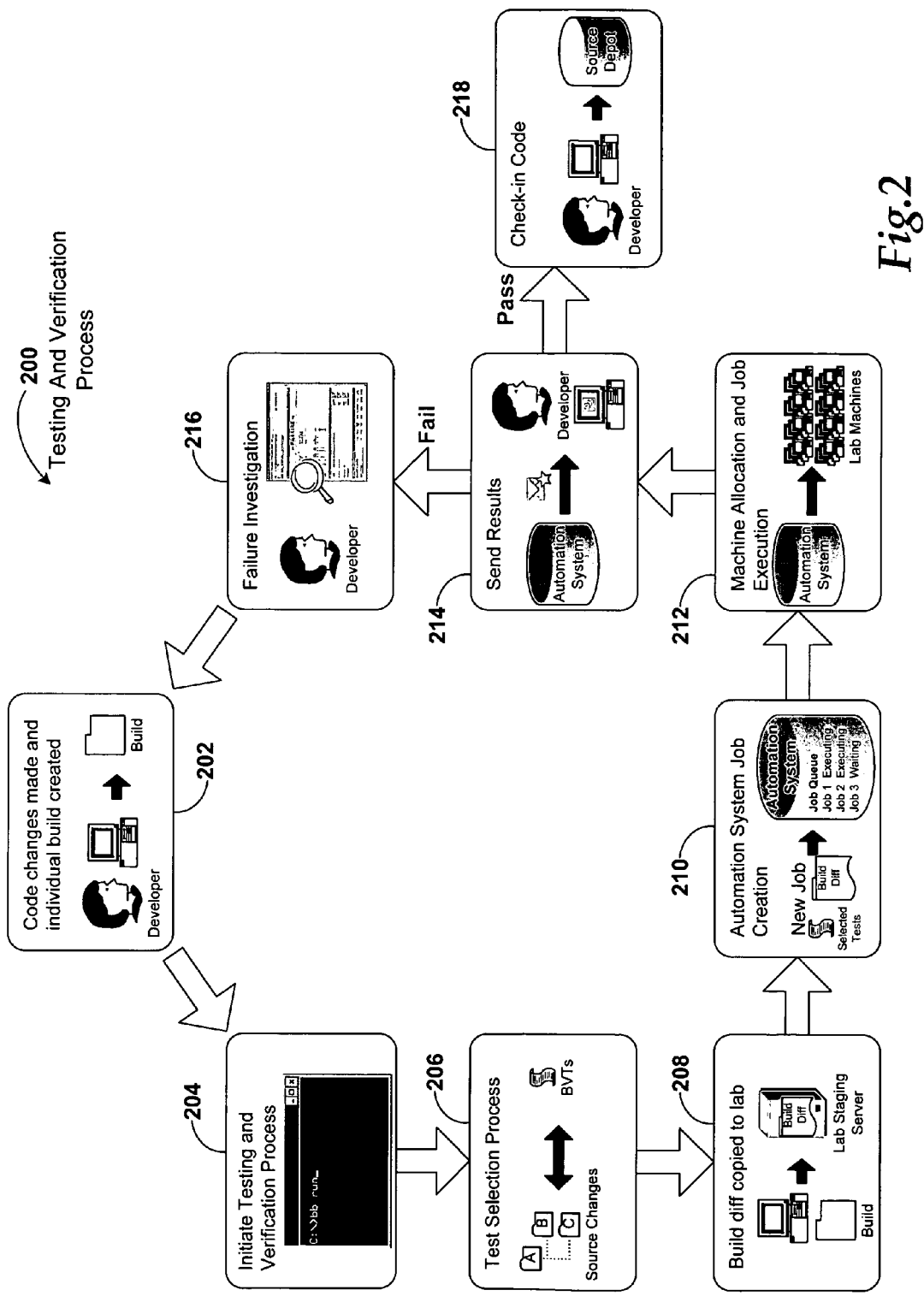
FIG. 2 illustrates an exemplary cyclical process for automation testing and verification of software code changes in accordance with the present invention.

FIG. 2 illustrates an exemplary cyclical process for automation testing and verification of software code changes in accordance with the present invention. In one embodiment, cycle 200 starts at block 202, where a developer has made code changes to a software project and has created an individual build of the code that corresponds to that project. Cycle 200 continues at block 204.

At block 204, the testing and verification process of the present invention is initiated. In one embodiment, the process is initiated through a simple instruction or selection. For example, the process may be initiated by a simple command line entry stating "bb run" as shown. Providing a simplified method for initiating the process assists in making the process more intuitive to the developer, and encourages use of the process to test code changes before they are submitted. Once the testing and verification process is initiated, cycle 200 continues at block 206.

At block 206, a set of automation tests to run against the individual build is selected. As stated previously, this process is described in detail in the patent application entitled, "System and Method for Selecting Applicable Tests in an Automation Testing System". Basically stated, in accordance with one aspect of the related invention, the test selection process selects applicable automation tests based on the areas of the software project affected by the code changes. Selecting the tests according to the code changes prevents jobs from running that include the entire list of BVTs. Including the test selection process reduces the time a particular automation testing job monopolizes the resources provided by the lab machines. In an alternative embodiment, a developer may override the default behavior of automatically selecting tests and specify a list of tests or a group of tests the developer wants to use instead. Once the test selection is complete, cycle 200 continues at block 208.

At block 208, the portion of the build that is determined as being different from the last build checkpoint is identified and forwarded to a lab staging server. The last build checkpoint corresponds to the latest version of the software that has passed testing and verification and is stored in the version control system. In one embodiment, the individual build created by the developer is not considered a complete build. Instead, only those portions of the build that have changed are built on the developer's computing device. The portions of the build that have not changed are copied from a central store that includes the build from the last checkpoint. A full image of the software product is produced on the developer's machine, but it is comprised of both generated and copied portions of the software. The testing and verification process separates these two portions out, so that a "build diff" portion of the build is determined. The build diff refers to the portion of the build that has changed from the last checkpoint and is arranged as a set of data files that is generated for forwarding to a lab staging server.

In one embodiment, when a checkpoint is added, a manifest is created on a lab staging sever for the build checkpoint image. The manifest includes the dates and sizes of the files associated with the build checkpoint image. To determine the portion of the individual build that has changed, the sizes and dates of the files on the developer's computing device are compared with the same files in the manifest. If the file sizes and dates are the same, then the files on the developer's computing device and those associated with the checkpoint are considered the same and so the file is not included in the build diff. If the file dates and sizes are different, then the file on the developer's computing device and the file associated with the checkpoint are considered different, and the file from the developer's machine is included in the build diff. In another embodiment, the manifest also contains unique identifiers for the original and built files that provided other means (e.g., MD5 calculation) to determine which files of the individual build are different from the checkpoint. Once the build diff is generated from comparing the checkpoint to the individual build, the build diff is then copied to the lab staging server. Cycle 200 then continues at block 210.

At block 210, a new job is created by an automation system or automation manager. The new job is associated with the diff build and the selected tests. Once the job is created and associated to the appropriate tests and diff build, the job is entered into a queue maintained by the Automation system. In one embodiment, the queue operates according to FIFO (first in first out), so that the first job submitted is the first job executed. In another embodiment, the jobs are given priorities according to source, where jobs submitted by lab staff or jobs to validate new checkpoints being added to the system are given priority over end users (e.g., developers and testers). Once the new job is created and entered into the queue, cycle 200 continues at block 212.

At block 212, the automation system takes jobs from the front of the queue, or the job with the highest priority, and assigns the job to a group of lab machines. The number of machines assigned to the particular job depends on the allocation of resources needed for that job. A method for determining the allocation of resources is described in the related patent application entitled, "System and Method for Allocating Automation Testing Resources Based on Projections". Basically stated, in accordance with one aspect of the related invention, the lab machines are allocated according a projection of the resources that are required based on historic trends of use for similar jobs. The projections allow a target time to be associated with the job so that the lab machines are allocated to hit that target time based upon previously run jobs. Once the job is assigned to the allocated group of lab machines, the job is executed. In one embodiment, the job is executed after configuring the lab machines with a build of the software that includes the files corresponding to the build diff. The build of the software corresponds to an image of the build created on the developer's computing device. In another embodiment, the lab machines are also configured with the automation tests to run against the build. Executing the job comprises running the selected automation tests against the build. After the job is executed, cycle 200 moves to block 214.

At block 214, the results are generated (see FIGS. 4 and 5) and forwarded to the developer's computing device for verification. In one embodiment, the results are forwarded to the developer using e-mail. Using e-mail to automatically report the results allows developers to concentrate on other tasks. The developer is not required to "poll" the system to see if their job is completed. As soon as the job is completed, their results are received. If the build of the software failed during the automation testing, cycle 200 moves to block 216. However, if the build is a success after the automation tests are run, cycle 200 advances to block 218.

At block 216, a report of the testing failure (see FIG. 5) may be analyzed by the developer. The report provides the developer with an itemized list of the failures that occurred during the job execution. The developer may receive the report via various means (e.g., e-mail) and is therefore not geographically limited to being near or having knowledge of the testing laboratory. Furthermore, the report may be disseminated amongst various users rather than being limited to the user that created the job. The list of failure may be truncated to a limit (e.g., 10), so when a number of failures above this threshold is reached, the developer may access the full list of failures at another location. The list of failures may also be grouped according to similarity with respect to the failure message reported and the specific automation tests that encountered the failure. Using the list of failures, the developer is able to make further code changes that correct the failures. With the additional code changes, cycle 200 may return to block 202, where the testing and verification process is repeated for the new changes.

In contrast, if the build that included the developer's original code changes passed the automation tests, the files including the code changes may be checked into the version control system. In one embodiment, the present invention serves as an automatic method for "gating" the check in of the code changes. The code changes are not allowed to be checked in if the changes resulted in errors. Checking in the code changes updates the version control system with the new code so that a new checkpoint build image includes the updates. Waiting for completion of the automation tests before checking in the code helps a developer find changes the developer is making that might otherwise break the build in lab. Many of the conflicts that occurred to untested code are avoided, preventing errors and delays for the software project. Furthermore, the present invention provides a single entry point for changes to the version control system so that different sets of tests for different projects having different results and dependencies may be used without requiring a developer to be aware of the differences. Furthermore, a much higher confidence rating is associated with the software build than would be otherwise before a full build of the software is generated (i.e., a build lab version that checks all code changes made by all developers against each other).

Many of the blocks within cycle 200 include a depiction of the developer assisting with the actions of the testing and verification process. In other embodiments, any one of these steps may be automated so that the developer interaction is not required. For example, once a lab build of the software has passed the automation testing, the code may be automatically checked in and stored in the version control system without consulting the developer. In other embodiments, the developer may be granted the ability to interact with the testing process where such interaction is not currently indicated in cycle 200. For example, the developer may be able to select additional BVTs from the database to run against the code changes in addition to those selected by the testing and verification process. A developer may also choose to override the selected set of tests and run a different set of tests against the code changes.

Other embodiments of the testing and verification process are not limited to the scenario involving a developer and making code changes, testing the code, verifying the code, and checking the code into a version control system. Other embodiments are also contemplated by the present invention. For example, another scenario involves using the testing and verification system of the present invention to assist in overnight verification of code. Still another scenario involves allowing the developers to check-in code and then subsequently running the testing and verification process on the resultant central build. Other processes are then used to trace any errors that occurred to the developer that instituted the code change that caused the error. In another example, the testing and verification process also takes advantage of other environments for validating an individual build other than the automation lab deployment. The process is used in concert with other verification processes that work to analyze and validate aspects of the individual build.

Figure 3:
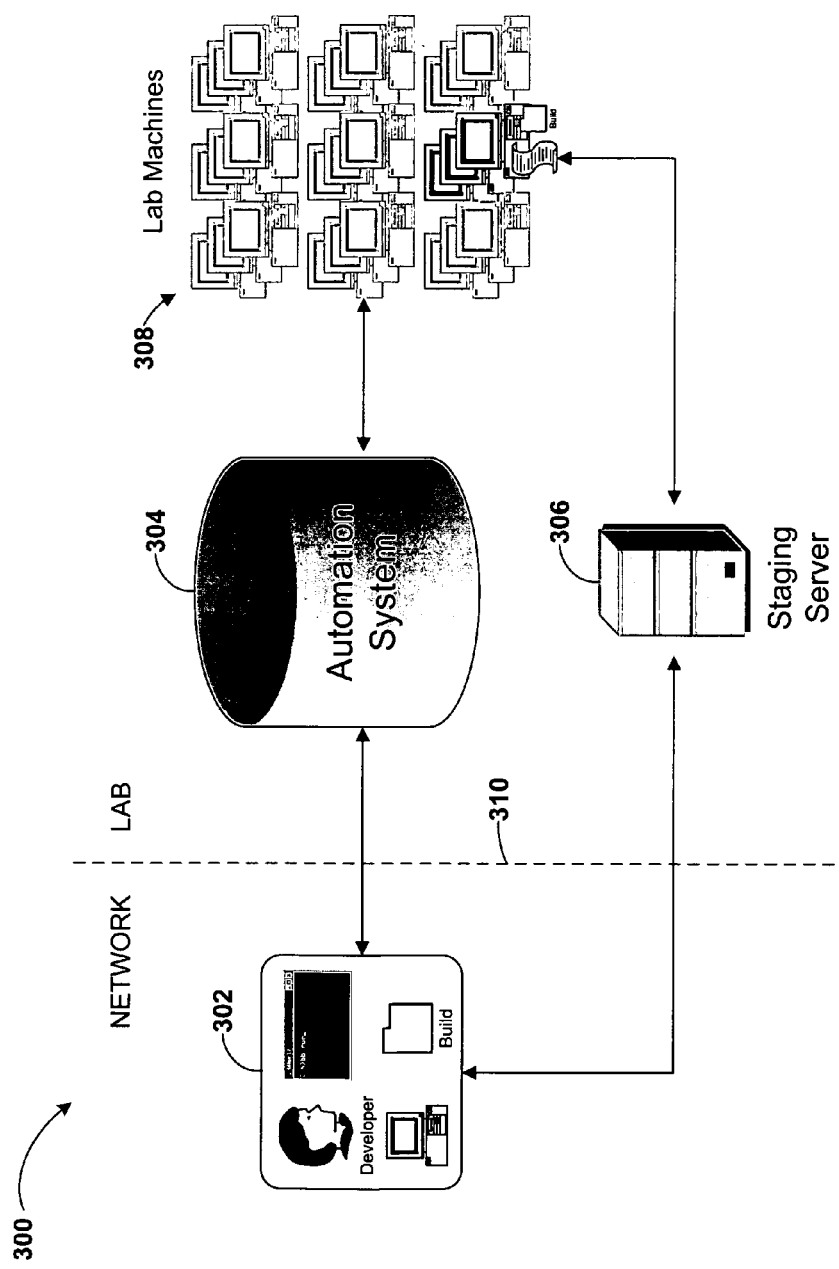
FIG. 3 illustrates a block diagram of an exemplary testing and verification system in accordance with the present invention.

FIG. 3 illustrates a block diagram of an exemplary testing and verification system in accordance with the present invention. System 300 provides another view that illustrates the interoperability between computing devices and servers during the testing and verification process. System 300 includes computing device 302, automation system 304, staging server 306, and lab machines 308. Dashed line 310 illustrates one exemplary logical division between network resources and lab resources.

In operation, an individual build of a software product that includes code changes by the developer is generated on computing device 302. In one embodiment, computing device 302 corresponds to computing device 100 described in the discussion of FIG. 1. Once the individual build is generated, the testing and verification process described in the discussion of FIG. 2 is initiated on computing device 302.

After initiating the testing and verification process, computing device 302 communicates with automation system 304 to select a set of BVTs to run against the build including the code changes. Computing device 302 sends automation system 304 information that describes the code changes made in the individual build. From the code change information, automation system 304 selects a set of BVTs to run against the build. Automation system 304 then forwards the set of tests to computing device 302.

After test selection is complete, computing device 302 determines a build diff corresponding to the individual build. The build diff includes the files of the build that corresponds to the changes made to the code. Computing devices 302 forwards the build diff to staging server 306.

In addition to transferring the build diff, computing device generates job information. The job information is transferred to automation system 304 to register the job in the queue provided by the system.

After inserting the job into the queue, automation system 304 allocates a specific number of lab machines to run the job within a range of time (e.g., under four hours). To prepare to execute the job, lab machines 308 that have been allocated are wiped clean of previous data. In one embodiment, lab machines 308 also retrieve the selected BVTs from automation system 304. In another embodiment, lab machines 308 are already loaded with the full listing of BVTs and the allocated lab machines simply retrieve the list of BVTs to run from automation system 304. Allocated lab machines 308 then retrieve the build diff from staging server 306. The build diff is then used to install a build image or lab build that matches the individual build generated on computing device 302.

With the build image reconstructed and installed on the allocated lab machines 308 and the selection of BVTs made, the allocated lab machines then run the BVTs against the build. As the runs are completed on each machine, the results are returned to automation system 304. Automation system 304 aggregates the results and forwards the results to computing device 302 where the results may be viewed by a developer or other user.

It is contemplated by the present invention that other topologies for system 300 may be used. For example, lab machines 308 may be organized so that the lab machines are organized into groups, with each group of lab machines coupled to a controller device (not shown) to assist in management and allocating resources within the group. Furthermore, network server (not shown) may be included between computing device 302 and the lab so that the testing and automation process is run using the server while computing device 302 merely provides user interface data to a developer or other user.

Figure 4:
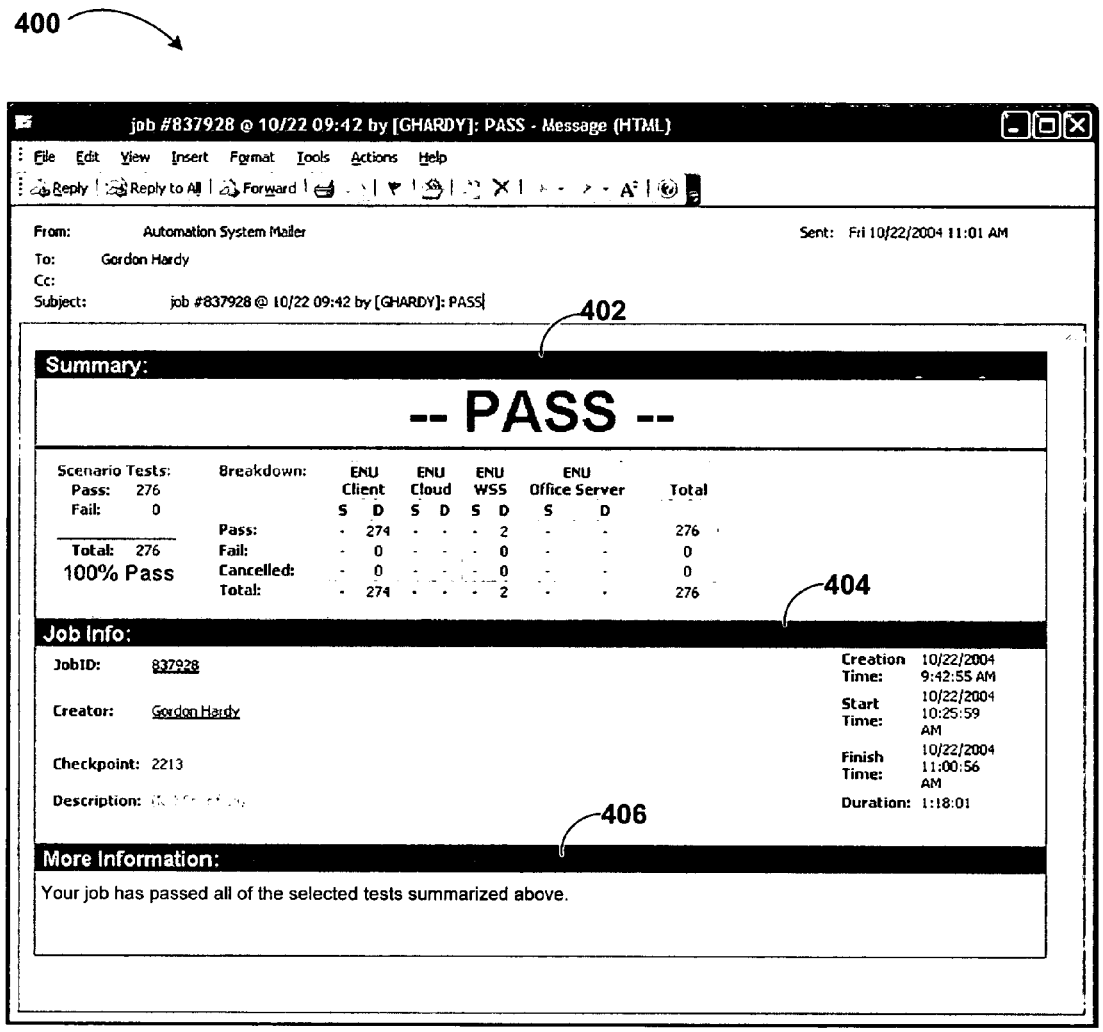
FIG. 4 illustrates an exemplary screenshot of an e-mail report for a passed job in accordance with the present invention.

FIG. 4 illustrates an exemplary screenshot of an e-mail report for a passed job in accordance with the present invention. Pass notification 400 includes a summary section 402, a job info section 404, and more information section 406.

Summary section 402 includes a summary of the results of the automation testing and verification process of the present invention. Summary section 402 lists the scenarios tested and a listing of the scenarios that passed, failed, or were cancelled, along with other information. Job info section 404 lists a job ID (identifier), the creator of the job, the checkpoint corresponding to the build tested, and other information about the job submitted. More information section 406 provides additional information pertinent to the job. Other sections in pass notification 400 are also contemplated without departing from the spirit and scope of the present invention.

Figure 5:
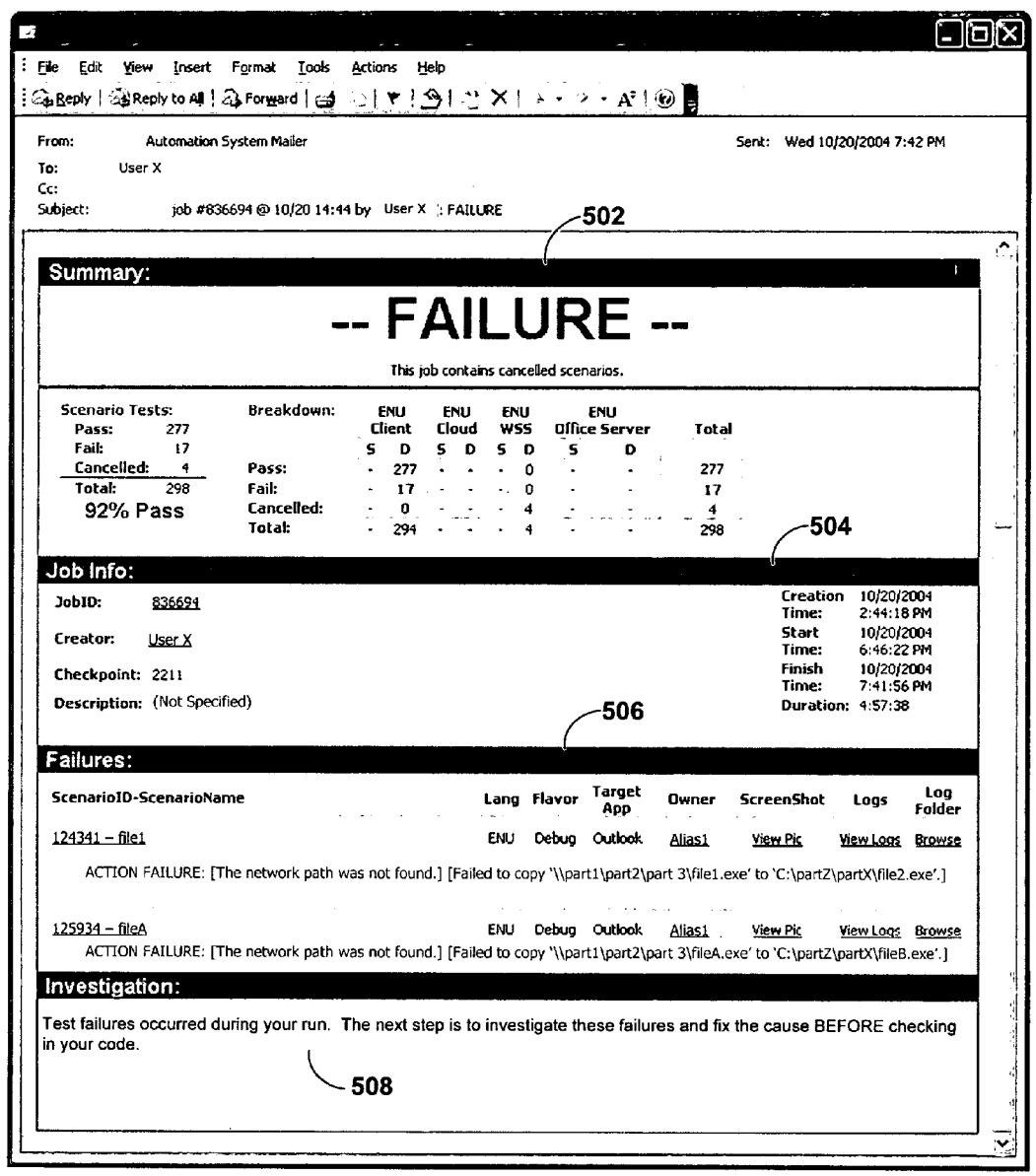
FIG. 5 illustrates an exemplary screenshot of an e-mail report for a failed job in accordance with the present invention.

FIG. 5 illustrates an exemplary screenshot of an e-mail report for a failed job in accordance with the present invention. Failure notification 500 includes a summary section 502, a job info section 504, failures section 506, and investigation section 508.

Failure notification 500 is similar to pass notification 400 shown in FIG. 4. Failure notification 500 also includes a summary section (502) and a job info section (504). However, failure notification 500 continues by providing a listing of the specific failures that occurred in failures section 506. The failures section 506 is exemplary only, and is not intended to provide a complete list of the failures related to failure notification 500. Also included is investigation section 508, which provides instruction for proceeding with an investigation of the failures and their correction. In another embodiment, another section referred to as a "config failures" section is also included (not shown). The config failures section includes any errors encountered during machine configuration. If the configuration failures are on a small scale (e.g., 1 machine fails to configure out of 5 machines allocated) then automation testing continues on the remaining machines. However, if configuration failures are on a larger scale (e.g., all machines fail to configure) then the job is canceled and notification is made within the config failures section (not shown) of failure notification 500. Other sections in failure notification 500 are also contemplated without departing from the spirit and scope of the present invention.

The notification e-mail or other type of notification (e.g., web page report, document report, etc.) described in FIGS. 4 and 5 may be distributed back to the job creator, to a team of developers, or to other groups of recipients.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for automation testing of code changes made to a software product code before the code changes are inserted into a version control system that stores a current build version of the software project, comprising:
   on a first computing device, determining a difference between an individual build of the software product and a checkpoint build of the software product; wherein the individual build is a build of the software product generated by a developer on the first computing device before being checked into a version control system and wherein the checkpoint build is a build of the software product that is checked into the version control system;
   on the first computing device, generating a set of data files that corresponds to the difference between the individual build and the checkpoint build;
   forwarding the set of data files from the first computing device to an allocated group of lab machines that are different from the first computing device, wherein the group of lab machines is allocated to run selected automation tests against a lab build of the software product and produce test results; wherein the lab build is a build of the software product that matches the individual build and wherein the lab build is created by a computing device that is different from the first computing device;
   wherein the selection of the automation tests is based on requirements obtained from at least one of the code changes made to the software product and a user input;
   receiving at the first computing device the test results produced from the allocated group of lab machines upon the completion of running the selected automation tests against the lab build.

2. The computer-implemented method of claim 1, further comprising initiating an automation testing and verification process according to a command line entry prior to selecting a set of automation tests.

3. The computer-implemented method of claim 1, wherein the automation tests are selected according to areas of the software product affected by the code changes that are present in the individual build when compared to the checkpoint build.

4. The computer-implemented method of claim 1, wherein determining the difference between the individual build and the checkpoint build further comprises separating the portion of the individual build currently generated from the portion of the individual build copied from a central store.

5. The computer-implemented method of claim 1, wherein determining the difference between the individual build and the checkpoint build further comprises comparing dates and sizes of files associated with the individual build with dates and sizes of files associated with the checkpoint build.

6. The computer-implemented method of claim 5, wherein the data file includes the files corresponding to the individual build that have different dates and sizes in comparison to the files corresponding to the checkpoint build.

7. The computer-implemented method of claim 1, further comprising registering a job request with an automation system to have the lab build run against the automation tests, wherein the automation system manages the allocated group of lab machines.

8. The computer-implemented method of claim 7, wherein the automation system allocates a specified number of lab machines to correspond to the allocated group of lab machines, whereby the test results are received within a selected range of time.

9. The computer-implemented method of claim 1, wherein forwarding the data file to the allocated group of lab machines further comprises forwarding the data file to a staging server such that the set of data files is retrievable from the staging server by the allocated group of lab machines.

10. The computer-implemented method of claim 1, further comprising generating the lab build from the set of data files and an image of the checkpoint build prior to running the automation tests against the lab build.

11. The computer-implemented method of claim 1, wherein the results are received as one of a pass notification and failure notification.

12. The computer-implemented method of claim 11, wherein the failure notification further indicates which failures occurred during the automation testing, whereby the failures may be investigated and corrected.

13. The computer-implemented method of claim 1, wherein the results are received in an automatically generated e-mail message that is created when the selected automation tests are complete.

14. A test automation and validation system for automation testing of code changes made to a software product code before the code changes are inserted into a version control system that stores a current build version of the software project, comprising:
   a first computing device that identifies code change information corresponding to the code changes in an individual build of a software product; wherein the individual build is a build of the software product generated by a developer on the first computing device before being checked into a version control system;

an automation manager that is separate from the first computing device that is arranged to receive the code change information from the first computing device, identify a set of automation tests based on requirements obtained from at least one of the code changes made to the software product and a user input, and manage a job queue that includes a job request for running the automated tests on the changed code using lab machines that are different from the first computing device and the automation manager; wherein the lab machines are allocated according to the job request such that an allocated group of the lab machines runs the set of automation tests against an image that matches the individual build of the software product to produce test results that are provided to the first computing device; wherein the image is created by the automation system.

15. The system of claim 14, further comprising a staging server that is arranged to receive a set of data files that corresponds to a portion of the individual build that includes the changed code, such that the set of data files is retrievable from the staging server by the allocated group of the lab machines.

16. The system of claim 14, wherein the automation manager is further configured to provide an aggregated result to the first computing device that corresponds to the test results received from completion of the automation tests on the allocated group of the lab machines.

17. A computer-readable medium for tangibly storing computer-executable instructions for automation testing of code changes made to a software product before the code changes are inserted into a version control system that stores a current build version of the software project, the computer-executable instructions comprising:

initiating an automation testing and verification process in response to a user request on a first computing device, the automation testing and verification process comprising:

on the first computing device, determining a difference between an individual build of the software product and a checkpoint build of the software product; wherein the individual build is a build of the software product generated by a developer on the first computing device before being checked into a version control system and wherein the checkpoint build is a build of the software product that is checked into the version control system;

on the first computing device, generating a set of data files that corresponds to the difference between the individual build and the checkpoint build;

forwarding the set of data files from the first computing device to an allocated group of lab machines that are different from the first computing device, wherein the group of lab machines is allocated to run selected automation tests against a lab build of the software product and produce test results; wherein the lab build is a build of the software product that matches the individual build and wherein the lab build is created by a computing device that is different from the first computing device; wherein the selection of the automation tests is based on requirements obtained from at least one of the code changes made to the software product and a user input; and providing a notification from the lab machines to the first computing device upon completion of the automation tests that represents an aggregation of the test results produced by the lab machines.

18. The computer-readable medium of claim 17, wherein determining the difference between the individual build and the checkpoint build further comprises separating the portion of the individual build currently generated from the portion of the individual build copied from a central store.

19. The computer-readable medium of claim 17, wherein determining the difference between the individual build and the checkpoint build further comprises comparing dates and sizes of files associated with the individual build with dates and sizes of files associated with the checkpoint build.

20. The computer-readable medium of claim 17, further comprising registering a job request with an automation system to have the lab build run against the automation tests, wherein the automation system manages the allocated group of lab machines.

* * * * *